United States Patent [19]

Yoshida

[11] Patent Number: 5,202,861
[45] Date of Patent: Apr. 13, 1993

[54] MAGNETO-OPTICAL DISK DRIVE HAVING A MECHANISM FOR MOVING A BIAS MAGNETIC FIELD COIL

[75] Inventor: Teruo Yoshida, Gunma, Japan

[73] Assignee: NEC Corporation, Tokyo, Japan

[21] Appl. No.: 800,130

[22] Filed: Nov. 29, 1991

[30] Foreign Application Priority Data

Nov. 29, 1990 [JP] Japan ................................ 2-331513

[51] Int. Cl.⁵ ...................... G11B 13/04; G11B 11/12; G11B 11/10
[52] U.S. Cl. .................................... 369/13; 360/114; 360/66; 360/59
[58] Field of Search ................. 369/13; 360/59, 114, 360/66, 60, 137

[56] References Cited

U.S. PATENT DOCUMENTS

| | | | |
|---|---|---|---|
| 5,027,334 | 6/1991 | Yamanaka et al. | 369/13 |
| 5,060,207 | 10/1991 | Kaneda et al. | 369/13 |

*Primary Examiner*—Hoa Nguyen
*Attorney, Agent, or Firm*—Sughrue, Mion, Zinn, Macpeak & Seas

[57] ABSTRACT

A magneto-optical disk drive in which a bias magnetic field coil is mounted on a cassette holder and movable into and out of contact with the cassette holder. A coil base carrying the coil is moved by connecting rods which are rotatably mounted on the cassette holder which is movable while receiving a cartridge therein. The connecting rods are rotated on the basis of a difference between the displacement of a body base which is stationary and the displacement of the cassette holder, whereby the coil base connected to the ends of the connecting rods is moved.

2 Claims, 3 Drawing Sheets

MAGNETO-OPTICAL DISK DRIVE HAVING A MECHANISM FOR MOVING A BIAS MAGNETIC FIELD COIL

BACKGROUND OF THE INVENTION

The present invention relates to a magneto-optical disk drive and, more particularly, to a magneto-optical disk drive of the type moving a bias magnetic field coil mounted on a cassette holder into and out of contact with the cassette holder.

A magneto-optical disk drive of the type described has mechanism for loading a cartridge which accommodates a magneto-optical disk therein. It is a common practice to provide the loading mechanism with a coil elevating mechanism of the kind rotating about a fulcrum which is defined on the base of the loading mechanism affixed to the disk drive. Such a coil elevating mechanism, therefore, moves over an extremely broad range, increasing the space which should be allocated to the loading mechanism. This obstructs the miniaturization of the disk drive. Moreover, a coil base carrying the coil thereon is constantly yieldably biased in a direction for loading a magneto-optical disk cartridge. The mechanical biasing force acting on the coil base is transferred to a cassette holder which is to accommodate the cartridge, increasing the force necessary for the cassette holder to be elevated. This increases the power consumption of a motor which is included in the mechanism for elevating the cassette holder and, therefore, the power consumption of the entire disk drive.

SUMMARY OF THE INVENTION

It is, therefore, an object of the present invention to provide a megneto-optical disk drive which promotes smooth moment of a bias magnetic field coil and has a miniature and power-saving configuration.

It is another object of the present invention to provide a generally improved magneto-optical disk drive.

A megneto-optical disk drive of the present invention comprises a cassette holder for accommodating a cartridge having a magneto-optical disk therein, a coil base mounted on the cassette holder, a bias magnetic field coil affixed to the coil base, a body base supporting the cassette holder, a loading device interposed between the cassette holder and the body base and movable on the body base in a reciprocating motion for moving the cassette holder toward and away from the body base, and a coil elevating device interposed between the cassette holder and the coil base for moving the coil base away from the cassette holder in association with the movement of the cassette holder away from the body base.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
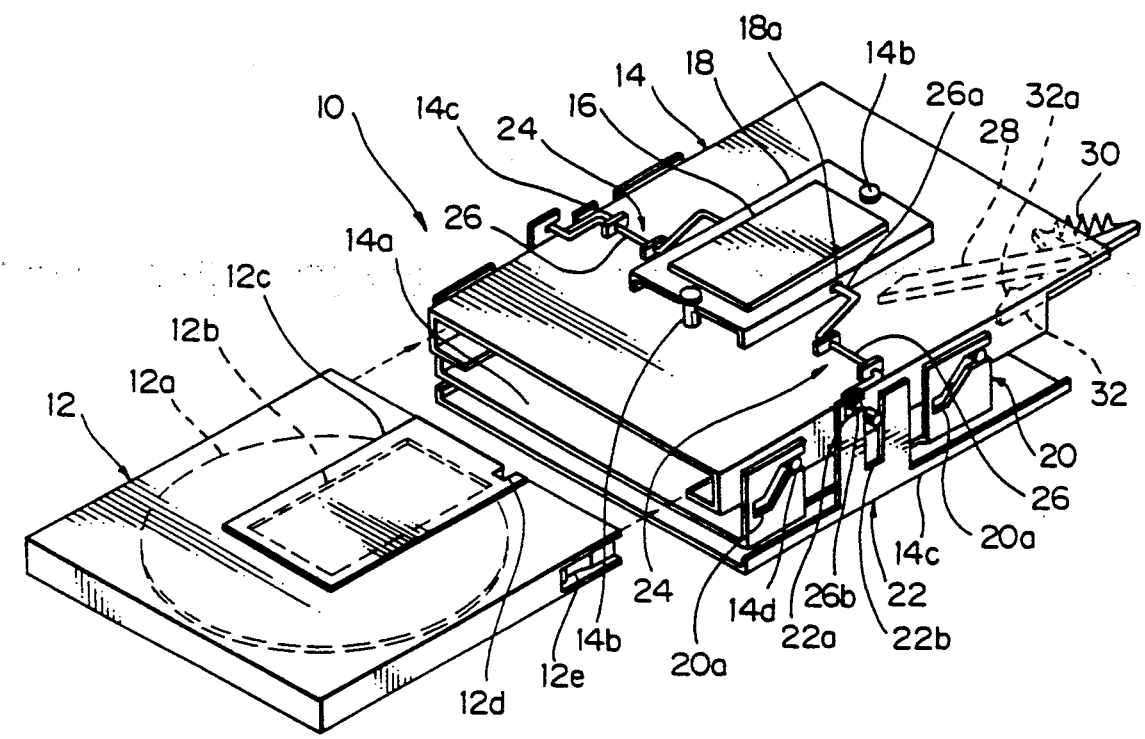
FIG. 1 is a perspective view showing a magneto-optical disk drive embodying the present invention.

Referring to FIG. 1 of the drawings, a magneto-optical disk drive embodying the present invention is shown and generally designated by the reference numeral 10. As shown, the disk drive 10 has a cassette holder 14 for accommodating a magneto-optical disk cartridge 12. A bias magnetic field coil 16 and a coil base 18 for the coil 16 are mounted on the cassette holder 14. The cassette holder 14 is supported by a body base 22 via a loading plate 20. The loading plate 20 is movable on the body base 22 in a reciprocating motion to move the cassette holder 14 toward and away from the body base 22. A pair of coil elevating mechanisms 24 connect the cassette holder 14 and coil base 18 such that the coil base 18 moves away from the cassette holder 14 when the cassette holder 14 is moved away from the body base 22 by the loading plate 20. Let the following description concentrate on only one of the pair of coil elevating mechanisms 24 for clarity. The coil elevating mechanism 24 has a connecting rod 26 which moves the coil base 18 away from the cassette holder 14 in interlocked relation to the movement of the cassette holder 14 away from the body base 22. When the coil base 18 rests on the cassette holder 14, the connecting rod 26 resiliently urges the coil base 18 against the cassette holder 14 by an adequate force.

A magneto-optical disk 12a is rotatably received in the magneto-optical disk cartridge 12. An opening 12b is formed though each of the front and rear of the cartridge 12 for allowing an optical head, not shown, to access the disk 12a. A shutter 12c usually closes the opening 12b to prevent dust and other impurities from entering the cartridge 12. The shutter 12c is formed with a notch 12d while the cartridge 12 is formed with a recess 12e. The cassette holder 14 has a space for accommodating the cartridge 12 therein and has an opening 14a for the ingress and egress of the cartridge 12. A shutter arm 28 is rotatably mounted on the cassette holder 14 and constantly biased toward the opening 14a of the cassette holder 14 by a spring 30. A lock lever 32 is also rotatably mounted on the cassette holder 14 and has at the free end thereof a lug 32a which mates with the recess 12e of the cassette 12. The lock lever 32 is constantly biased by the spring 30 so as to maintain the cassette holder 14 in a predetermined position within the cassette holder 14.

Projections 14b extend out from the cassette holder 14 and support the coil base 18 such that the coil base 18 is movable back and forth with directivity. The connecting role 26 is resilient and rotatably supported by a fulcrum 14c provided on the cassette holder 14. One end 26a of the connecting rod 26 is received in a hole 18a formed through one side wall of the coil base 18. The other end 26b of the connecting rod 26 is received in a notch 22a which is formed in the body base 22 in order to position the cassette holder 14 in the direction for inserting the cartridge 12. The cassette holder 14 is received in a groove 22b formed in the body base 22, so that it may be movable back and forth in a direction perpendicular to the direction of cartridge insertion. Rollers 14d are rollably mounted on the side walls of the cassette holder 14, and each is received in one of grooves 20a which are formed in the loading plate 20.

The loading plate 20 is mounted on the body base 22 in such a manner as to be movable in a reciprocating motion in the same direction as the direction of cartridge insertion. The coil 16 is affixed to the coil base 18.

Figure 2:
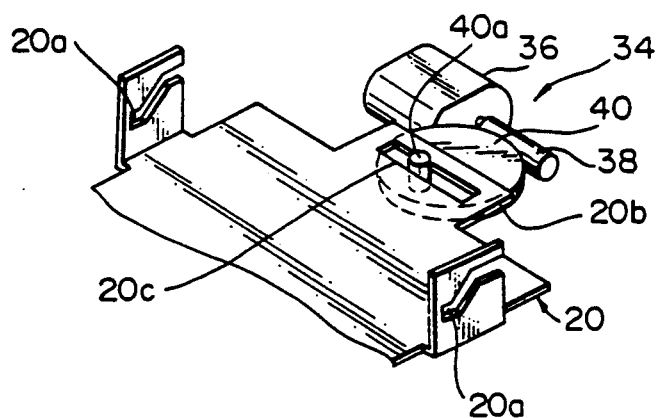
FIG. 2 is a perspective view showing a device included in the embodiment for driving a loading plate.

FIG. 2 shows a device 34 for driving the loading plate 20. As shown, the device 34 has a motor 36, a worm gear 38 mounted on the output shaft of the motor 38, and a gear wheel 40 held in mesh with the worm gear 38. A pin 40a is studded on the gear disk 40 in close proximity to the circumferential edge of the gear wheel 40. The pin 40a is received in an elongate slot 20c formed through a protuberance 20b which extends out from the loading plate 20.

Figure 3A:
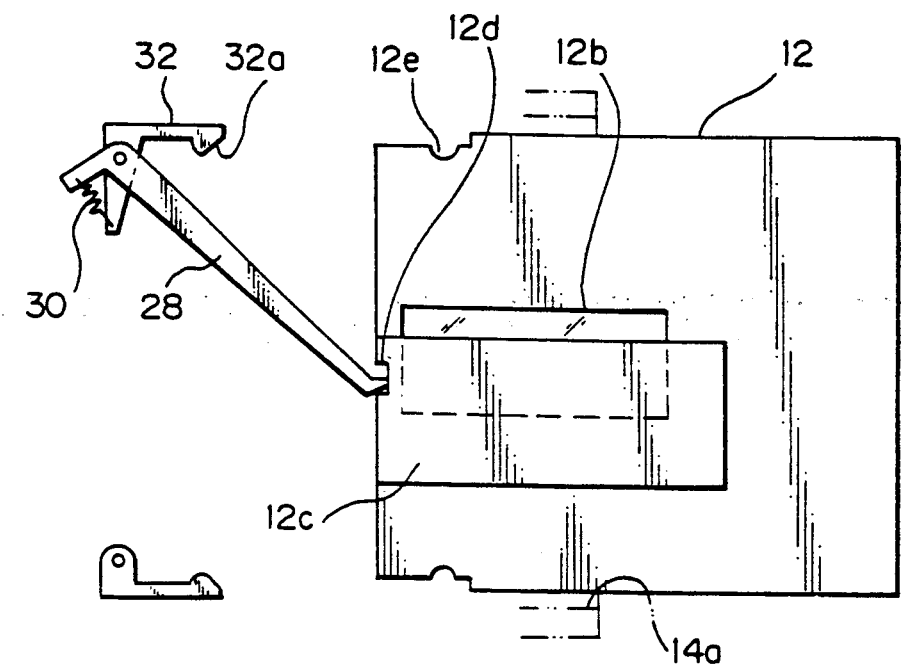
FIGS. 3A and 3B demonstrate the operation of the embodiment for loading a magnetic disk cartridge.
Figure 3B:
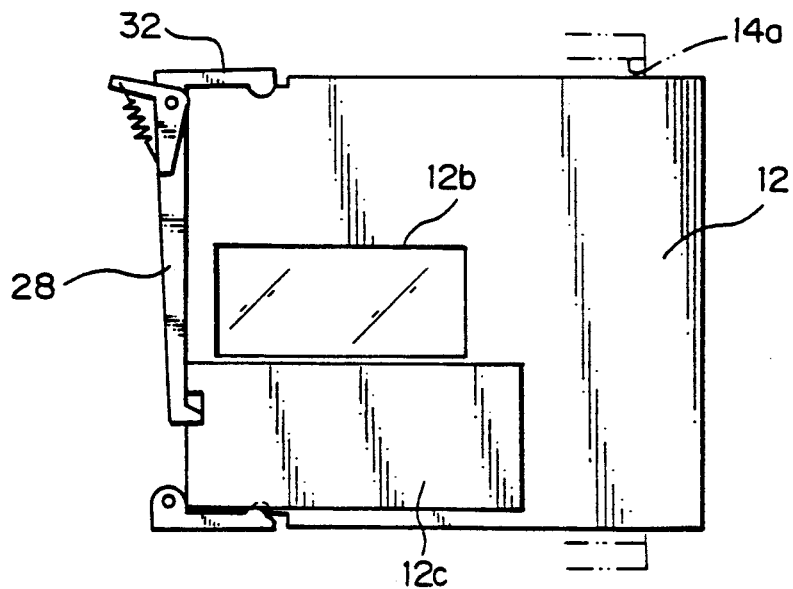

In operation, the cartridge 12 is inserted into the cassette holder 14 via the opening 14a, as shown in FIG. 3A. Then, the free end of the shutter arm 28 mates with the notch 12d of the shutter 12c. As the cartridge 12 is inserted deeper into the cassette holder 14, the shutter arm 28 opens the shutter 12c wider while being rotated by the cassette 12. When the cartridge 12 reaches a predetermined position shown in FIG. 3B, the shutter arm 28 fully opens the shutter 12c. In this condition, the lug 32a of the lock lever 32 mates with the recess 12e of the cartridge 12 to lock the cassette holder 14 in the predetermined position.

Figure 4A:
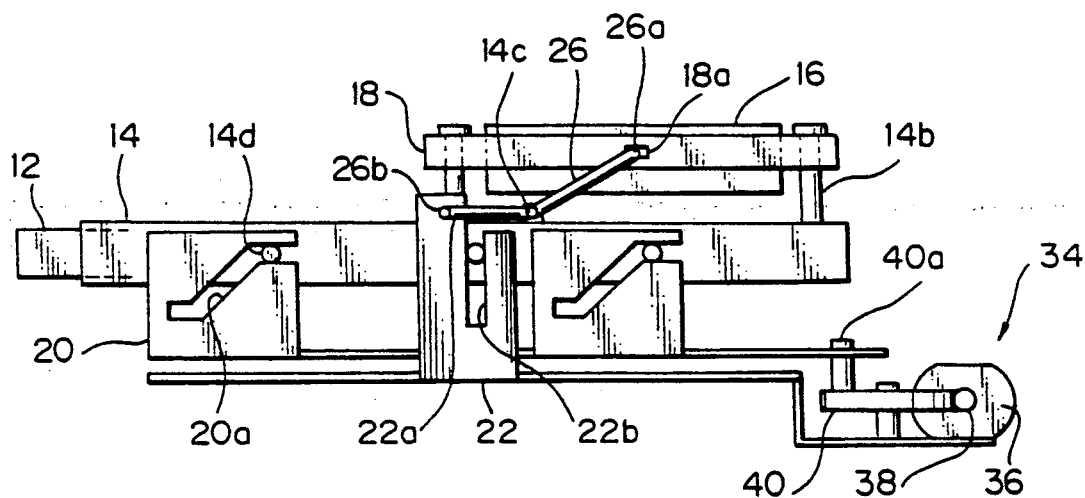
FIGS. 4A and 4B show the upward and downward movements of a cassette holder also included in the embodiment.
Figure 4B:
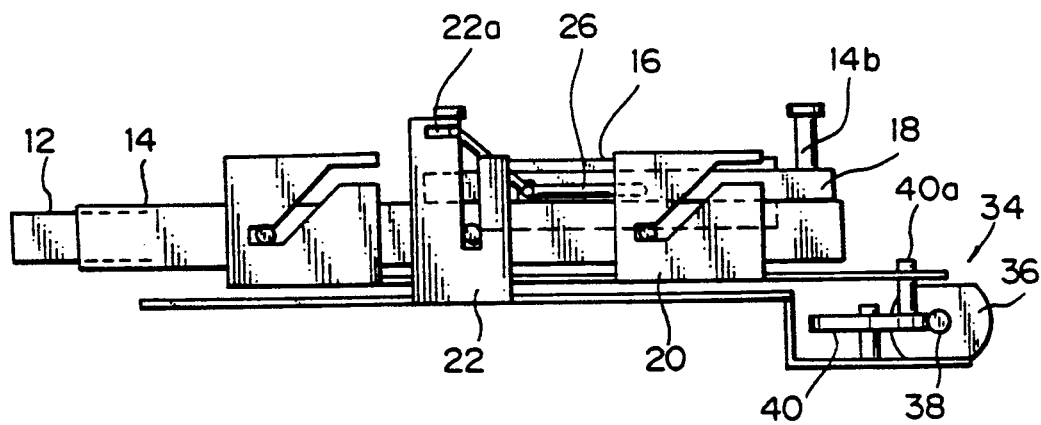

Subsequently, the loading plate 20 is moved, as shown in FIGS. 4A and 4B. Then, the cassette holder 14 received in the groove 20a of he loading plate 20 is moved along the groove 22a of the body base 22 in the direction perpendicular to the direction of movement of the loading plate 20, thereby moving the cartridge 12 to a predetermined position. When the cassette holder 14 is so moved, the intermediate portion of the connecting rod 26 moves together with the cassette holder 14 while the end 26b of the rod 26 remains in the groove 22a of the body base 22. As a result, the connecting rod 26 rotates about the fulcrum 14c of the cassette holder 14. Hence, the end 26a of the connecting rod 26 moves in the same direction as the cassette holder 14 to move the coil base 18 which is engaged with the end 26a. Consequently, the coil 16 mounted on the coil base 18 is brought to a predetermined position.

When the cassette holder 14 is moved as stated above, the end 26a of the resilient connecting rod 26 is displaced over a distance which is the sum of a displacement actually needed by the coil base 18 and a displacement necessary for the connecting rod 26 to exert an urging force great enough to prevent the coil base 18 from falling to remain in the predetermined position due to externally derived disturbances. This is successful in maintaining the coil base 18 and, therefore, the coil 16 stably in the above-mentioned position.

In summary, in accordance with the present invention, a coil base carrying a bias magnetic field coil thereon is moved by connecting rods which are rotatably mounted on a cassette holder which is movable while receiving a cartridge therein. The connecting rods are rotated on the basis of a difference between the displacement of a body base which is stationary and the displacement of the cassette holder, whereby the coil base connected to the ends of the connecting rods is moved. This miniaturizes the mechanism for elevating the coil and, therefore, the entire disk drive. Since the connecting rods are resilient, the coil can be stably held in the disk drive. Moreover, a cartridge elevating mechanism is operable with a miniature motor and, therefore, reduces the size of the entire disk drive as well as power consumption. This is partly because the connecting rods exert a resilient force for stabilizing the coil base only after the upward movement and at the end of the downward movement and partly because, when the cartridge elevating mechanism needs the maximum driving force, i.e., when the disk should be removed from a magnet affixed to a spindle hub of the disk drive, only the force for elevating the coil and coil base is added.

Various modifications will become possible for those skilled in the art after receiving the teachings of the present disclosure without departing from the scope thereof.

What is claimed is:

1. A magneto-optical disk drive comprising:
    a cassette holder for accommodating a cartridge having a magneto-optical disk therein;
    a coil base mounted on said cassette holder;
    a bias magnetic field coil affixed to said coil base;
    body base supporting said cassette holder;
    loading means interposed between said cassette holder and said body base and movable on said body base in a reciprocating motion for moving said cassette holder toward and away from said body base; and
    coil elevating means interposed between said cassette holder and said coil base for moving said coil base away from said cassette holder in association with the movement of said cassette holder away from said body base;
    wherein said coil elevating means comprises a connecting rod for moving said coil base away from said cassette holder in association with the movement of said cassette holder away from said body base, wherein said connecting rod presses, when said coil base contacts said cassette holder, said coil base against said cassette holder with an adequate degree of biasing force.

2. A magneto-optical disk drive as claimed in claim 1, further comprising drive means for driving said loading means.

* * * * *

UNITED STATES PATENT AND TRADEMARK OFFICE
CERTIFICATE OF CORRECTION

PATENT NO. : 5,202,861
DATED : 4/13/93
INVENTOR(S) : Teruo Yoshida

It is certified that error appears in the above-indentified patent and that said Letters Patent is hereby corrected as shown below:

Col. 3, line 49, delete "falling" and isnert --failing--.

Signed and Sealed this

Eleventh Day of January, 1994

Attest:

BRUCE LEHMAN

*Attesting Officer*  *Commissioner of Patents and Trademarks*